United States Patent
Kim et al.

(10) Patent No.: US 8,508,157 B2
(45) Date of Patent: Aug. 13, 2013

(54) POWER SUPPLY DEVICE FOR DRIVING LIGHT EMITTING DIODE

(75) Inventors: Tae Shik Kim, Gyunggi-do (KR); Heung Gyoon Choi, Gyunggi-do (KR); Yun Ki Kang, Seoul (KR); Tae Hyung Kang, Gyunggi-do (KR); Sang Gab Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 212 days.

(21) Appl. No.: 13/181,045

(22) Filed: Jul. 12, 2011

(65) Prior Publication Data

US 2012/0007512 A1 Jan. 12, 2012

(30) Foreign Application Priority Data

Jul. 12, 2010 (KR) .................. 10-2010-0067093

(51) Int. Cl.
*G05F 1/00* (2006.01)

(52) U.S. Cl.
USPC ........... 315/308; 315/307; 315/291; 315/224; 315/294; 315/185 R; 315/160; 315/312; 363/21.07; 363/21.08; 363/21.09

(58) Field of Classification Search
USPC .................. 315/160, 165, 185 R, 200 R, 212, 315/209 R, 224, 291, 294, 307, 308, 244, 315/247, 276, 278, 312, 318, DIG. 7; 363/21.07, 21.08, 21.09, 21.15, 21.16, 21.17
See application file for complete search history.

(56) References Cited

U.S. PATENT DOCUMENTS

| | | | | |
|---|---|---|---|---|
| 6,104,622 | A * | 8/2000 | Shin | 363/21.07 |
| 7,557,521 | B2 * | 7/2009 | Lys | 315/294 |
| 8,148,911 | B2 * | 4/2012 | Chen et al. | 315/250 |
| 2011/0080110 | A1 * | 4/2011 | Nuhfer et al. | 315/291 |
| 2011/0127921 | A1 * | 6/2011 | Lin et al. | 315/192 |
| 2011/0260631 | A1 * | 10/2011 | Park et al. | 315/165 |
| 2012/0104956 | A1 * | 5/2012 | Yang et al. | 315/201 |
| 2012/0112645 | A1 * | 5/2012 | Lee et al. | 315/186 |

FOREIGN PATENT DOCUMENTS

| | | |
|---|---|---|
| JP | 2004-527138 A | 9/2004 |
| KR | 10-2008-0084028 A | 9/2008 |
| KR | 10-2009-0073992 | 7/2009 |
| KR | 10-2009-0105116 | 10/2009 |
| WO | WO 02/096162 A1 | 11/2002 |

OTHER PUBLICATIONS

Korean Office Action, w/ English translation thereof, issued in Korean Patent Application No. 10-2010-0067093, dated Sep. 22, 2001.

\* cited by examiner

*Primary Examiner* — Haiss Philogene
(74) *Attorney, Agent, or Firm* — McDermott Will & Emery LLP

(57) ABSTRACT

A power supply device for driving a light emitting diode (LED) capable of controlling the switching of multiple output powers, in synchronization with the frequency of one of the multiple output powers and simplifying a power conversion stage in supplying power for driving an LED.

33 Claims, 11 Drawing Sheets

POWER SUPPLY DEVICE FOR DRIVING LIGHT EMITTING DIODE

CROSS-REFERENCE TO RELATED APPLICATIONS

This application claims the priority of Korean Patent Application No. 10-2010-0067093 filed on Jul. 12, 2010, in the Korean Intellectual Property Office, the disclosure of which is incorporated herein by reference.

BACKGROUND OF THE INVENTION

1. Field of the Invention

The present invention relates to a power supply device and, more particularly, to a power supply device for driving a light emitting diode (LED) capable of controlling the switching of multiple output powers, in synchronization with the frequency of one of the multiple output powers and simplifying a power conversion stage in supplying power for driving an LED.

2. Description of the Related Art

A power supply device has been widely used for information devices such as a personal computer, and the like, and home appliances such as an air-conditioner, an audio system, a visual device, and the like.

The power supply device may provide a plurality of output powers depending on the electronic devices to which the power supply device is applied.

A general multi-power source supply device converts an input DC power into an AC power through a single transformer and then rectifies the converted AC power, respectively, to output a plurality of DC powers. However, the general multi-power source supply device has a problem in that when a voltage level of a single DC power, among the plurality of DC powers, is changed by the single transformer, the remaining DC powers are affected, so cross-regulation is therefore not maintained. To solve this problem, a step-down chopper circuit (or a buck chopper circuit) is employed at an output stage, but re-conversion of power by the step-down chopper circuit after a primary power conversion degrades power conversion efficiency and the presence of the step-down chopper circuit increases the number of components, resulting in an increase in fabrication costs.

In addition, when the power supply device is employed to drive LEDs, a boost circuit (or a voltage step-up circuit) or a buck circuit (or a voltage step-down circuit) is required to compensate for a voltage deviation among the LEDs after the primary power conversion, which also degrades power conversion efficiency and increases the number of required components, thereby increasing fabrication costs.

SUMMARY OF THE INVENTION

An aspect of the present invention provides a power supply device for driving a light emitting diode (LED) capable of controlling the switching of multiple output powers, in synchronization with the frequency of one of the multiple output powers and simplifying a power conversion stage in supplying power for driving an LED.

According to an aspect of the present invention, there is provided a power supply device for driving a light emitting diode (LED), including: a power conversion unit converting an input power into a plurality of first powers according to a pre-set first conversion scheme and converting the input power into a second power according to a second conversion scheme set to be different from the first conversion scheme; a current balancing unit maintaining current balancing of the plurality of first powers from the power conversion unit; an LED driving unit supplying the plurality of first powers maintained in current balancing by the current balancing unit to a plurality of LED units, respectively, and detecting a power and a current supplied to the LED units; an operating unit performing a pre-set operation upon receiving the second power from the power conversion unit; a feedback unit having a first feedback unit feeding back a detection signal from the LED driving unit and a second feedback unit feeding back a detection signal detecting the voltage of the second power supplied to the operating unit; and a power conversion controller controlling a power conversion switching frequency of the plurality of first powers of the power conversion unit according to the detection signal from the feedback unit and controlling the duty of the second power of the power conversion unit, in synchronization with the power conversion switching frequency.

The first feedback unit may be a first photocoupler transferring a second detection signal detecting a current level flowing across the LED units from the LED driving unit and a voltage level of the first power supplied to the LED driving unit, to the power conversion controller, and the second feedback unit may be a second photocoupler transferring a second detection signal detecting a voltage level of the second power supplied to the operating unit, to the power conversion controller.

The power conversion controller may control a constant current of the first power and control a constant voltage of the second power.

The power conversion controller may include: a frequency controller controlling the power conversion switching frequency according to results obtained by comparing a voltage level of the first detection signal and a voltage level of a pre-set first reference voltage; a saw-tooth wave generation unit generating a saw-tooth wave according to the power conversion switching frequency from the frequency controller; a duty controller controlling a switching duty of the power conversion circuit by comparing an error between a voltage level of the second detection signal and that of a pre-set second reference voltage and the saw-tooth wave from the saw-tooth wave generation unit; and a switching controller providing first and second switching signals controlling the alternate switching of the power conversion circuit.

The frequency controller may include: a first error amplifier comparing the voltage level of the first detection signal and that of the pre-set first reference voltage and amplifying the comparison result according to a pre-set amplification rate; a first resistor setting an amplification rate of the first error amplifier according to a pre-set resistance value; and a frequency setting unit setting the power conversion switching frequency according to the comparison result amplified by the first error amplifier.

The duty controller may include: a second error amplifier comparing the voltage level of the second detection signal and that of the pre-set second reference voltage and amplifying the comparison result according to a pre-set amplification rate; a second resistor setting an amplification rate of the second error amplifier according to a pre-set resistance value; a comparator comparing the comparison result amplified by the second error amplifier and a voltage level of the saw-tooth wave from the saw-tooth wave generation unit; and a duty setting unit setting a switching duty of the power conversion unit according to the comparison result from the comparator.

The conversion unit may include: a switching unit having first and second switches alternately switched under the control of the power conversion controller; a conversion unit converting power switched by the switching unit into power having a voltage level determined according to a pre-set winding ratio, respectively; and a rectifying unit rectifying power converted by the conversion unit to output the second power.

The conversion unit may be an LLC resonance type conversion unit having a resonance capacitor and a resonance inductor connected in series to power input terminals of the first and second switches and a magnetized inductor connected in parallel to the first and second switches.

The conversion unit may include: a primary winding (or a primary coil) receiving switched power from the switching unit; a first secondary winding group (or a first secondary coil group) having a plurality of first secondary windings converting a voltage level of received power according to a winding ratio formed as the first secondary winding group is electromagnetically coupled to the primary winding, and outputting the first power; and a second secondary winding converting a voltage level of received power according to a winding ratio formed as the second secondary winding is electromagnetically coupled to the primary winding, and outputting the second power.

The conversion unit may include: a first primary winding connected in parallel to the first switch of the switching unit; a second primary winding connected in parallel to the second switch of the switching unit; a first secondary winding group having a plurality of first secondary windings converting a voltage level of received power according to a winding ratio formed as the first secondary winding is electromagnetically coupled to the first primary winding, and outputting the first power; and a second secondary winding converting a voltage level of received power according to a winding ratio formed as the second secondary winding is electromagnetically coupled to the second primary winding, and outputting the second power.

The current balancing unit may rectify each of driving powers from the power conversion unit and maintain current balancing among driving powers of the plurality of secondary windings according to the charge balance law.

The rectifying unit may include at least one rectifier group having at least two rectifiers, and each of the at least two rectifiers may provide power to the plurality of LED units and may have one capacitor to maintain current balancing in power supplied to the plurality of corresponding LED units according to the charge balance law.

The plurality of LED units may include a first LED lamp, a second LED lamp, a third LED lamp, and a fourth LED lamp, the power conversion unit may include at least one primary winding receiving switched power and a first secondary winding group having a plurality of first secondary windings forming a winding ratio with the at least one primary winding to output the plurality of first powers, respectively, and the at least one rectifier group may include: a first rectifier rectifying driving power from a first first secondary winding of the first secondary winding group and supplying the driving power in a current balance maintained state to the first and second LED lamps; and a second rectifier rectifying driving power from a second first secondary winding of the first secondary winding group and supplying the driving power in a current balance maintained state to the third and fourth LED lamps.

The first rectifier may include: a first capacitor connected in series to one end of the first first secondary winding and maintaining current balancing between negative driving power and positive driving power from the first first secondary winding according to the charge balance law; a first rectifying diode group rectifying driving power from the first capacitor; and first and second stabilization capacitors connected in series to a corresponding LED lamp among the first and second LED lamps to stabilize supplied driving power, and the second rectifier may include: a second capacitor connected in series to one end of the second first secondary winding and maintaining current balancing between negative driving power and positive driving power from the second secondary winding; a second rectifying diode group rectifying driving power from the second capacitor; and third and fourth stabilization capacitors connected in parallel to a corresponding LED lamp among the third and fourth LED lamps to stabilize provided driving power.

The first and second rectifying diode groups may include first to fourth rectifying diodes, respectively, the first or second capacitor may be electrically connected in series between one end of the first or second first secondary winding and an anode of the first rectifying diode, the anode of the first rectifying diode may be electrically connected to the first or second capacitor and a cathode of the third rectifying diode, a cathode of the first rectifying diode may be electrically connected to one end of the second or fourth stabilization capacitor and one end of the second or fourth LED lamp, a cathode of the second rectifying diode and an anode of the fourth rectifying diode may be electrically connected to the other end of the first or second first secondary winding, a cathode of the fourth rectifying diode may be electrically connected to one end of the first or third stabilization capacitor and one end of the first or third LED lamp, and the other end of the first to fourth stabilization capacitors, the other ends of the first to fourth LED lamps, and anodes of the second and third rectifying diodes may be grounded.

The first and second rectifying diode groups may include first and second rectifying diodes, respectively, the first or second capacitor may be electrically connected in series between one end of the first or second first secondary winding and the anode of the second rectifying diode, the anode of the first rectifying diode may be electrically connected to the other end of the first or second secondary winding, the cathode of the first rectifying diode may be electrically connected to one end of the first or third stabilization capacitor and one end of each of the first to third LED lamps, the anode of the second rectifying diode may be electrically connected together with the first or second capacitor to the other end of the first or third stabilization capacitor and the other end of each of the first to third LED lamps, the cathode of the second rectifying diode may be electrically connected to one end of the second or fourth stabilization capacitor and one end of each of the second to fourth LED lamps, and the other end of the second or fourth stabilization capacitor and the other end of each of the second and fourth LED lamps may be electrically connected to the other end of first or second first secondary winding.

The first rectifier may include: a first capacitor connected in series to a center tap of the first first secondary winding of the first secondary winding group and maintaining current balancing between negative driving power and positive driving power from the first first secondary winding according to the charge balance law; a first rectifying diode group rectifying driving power from the first capacitor; and first and second stabilization capacitors connected in parallel to a corresponding LED lamp among the first and second LED lamps to stabilize supplied driving power, the second rectifier may include: a second capacitor connected in series to a center tap of the second first secondary winding of the first secondary winding group and maintaining current balancing between negative driving power and positive driving power from the second first secondary winding according to the charge balance law; a second rectifying diode group rectifying driving power from the second capacitor; and third and fourth stabilization capacitors connected in parallel to a corresponding LED lamp among the third and fourth LED lamps to stabilize supplied driving power, the first and second rectifying diode groups may include first and second rectifying diodes, respectively, the first or second capacitor may be electrically connected in series between the center tap of the first or second secondary winding and a ground, the anode of the first rectifying diode may be electrically connected to one end of the first or second secondary winding, the cathode of the first rectifying diode may be electrically connected to one end of the first or third stabilization capacitor and one end of each of the first and third LED lamps, the anode of the second rectifying diode may be electrically connected to the other end of the first or second first secondary winding, the cathode of the second rectifying diode may be electrically connected to one end of the second or fourth stabilization capacitor and one end of each of the second and fourth LED lamps, and the other end of each of the first to fourth stabilization capacitors and the other end of each of the first to fourth LED lamps may be grounded.

The number of windings of each of the first secondary windings of the first secondary winding group may be the same.

Each of the plurality of LED units may include at least one LED, at least one LED row in which a plurality of LEDs are connected in series, or a plurality of LED rows connected in parallel to each other.

The rectifying unit may include a plurality of rectifying groups.

The current balancing unit may transfer the plurality of first powers from the power conversion unit to each of the LED units such that power of a half period of the plurality of first powers is transferred to the odd numbered LED units among the plurality of LED units and power of the other remaining half period of the plurality of first powers is transferred to the even numbered LED units among the plurality of LED units according to a switching period of the power conversion unit, and maintain current balancing between the power of the half period and the power of the other remaining half period of the plurality of first powers according to the charge balance law.

The power conversion unit may include a first secondary winding group having at least one primary winding receiving switched power and a plurality of first secondary windings electromagnetically coupled to the at least one primary winding to output the plurality of powers according to the winding ratio, and the current balancing unit may include a plurality of capacitors electrically connected to the plurality of first secondary windings, respectively, to maintain current balancing according to the charge balance law; and a path providing unit providing an electrical connection path of power transferred from the current balancing unit to the plurality of LED units according to each half period of the plurality of first powers from the power conversion unit.

The path providing unit may include: a first diode group having a plurality of diodes each having a cathode connected to one end of each of the plurality of LED units; a second diode group having a plurality of diodes which are matched in a one-to-one manner to the plurality of diodes of the first diode group and have a cathode connected to an anode of each of the plurality of diodes of the first diode group; and a third diode group having a plurality of diodes which are matched in a one-to-one manner to the plurality of diodes of the second diode group and have a cathode connected to an anode of each of the plurality of diodes of the second diode group and an anode connected to a ground.

A first first secondary winding of the plurality of first secondary windings may be electrically connected between anodes of the first and second diodes among the plurality of diodes of the first diode group, and a second first secondary winding of the plurality of the first secondary windings may be electrically connected between anodes of the second and third diodes among the plurality of diodes of the second diode group.

A third first secondary winding of the plurality of first secondary windings may be electrically connected between anodes of the third and fourth diodes among the plurality of diodes of the first diode group, a fourth first secondary winding of the plurality of the first secondary windings may be electrically connected between anodes of the fourth and fifth diodes among the plurality of diodes of the second diode group, the connection relationship between the plurality of first secondary windings and the plurality of diodes of the first diode group or the plurality of diodes of the second diode group is repeated, and the last first secondary winding of the plurality of first secondary windings may be electrically connected between anodes of the last diode and the first diode of the plurality of diodes of the second diode group.

The first capacitor of the plurality of capacitors may be electrically connected between one end of the first first secondary winding and the anode of the second diode of the first diode group, and the second capacitor of the plurality of capacitors may be electrically connected between one end of the second first secondary winding and the anode of the third diode of the second diode group.

The third capacitor of the plurality of capacitors may be electrically connected between one end of the third first secondary winding and the anode of the fourth diode of the first diode group, the second capacitor of the plurality of capacitors may be electrically connected between one end of the second first secondary winding and the anode of the fifth diode of the second diode group, the connection relationship of each of the plurality of capacitors between one end of the secondary winding and the anode of the diode of the first or second diode group is repeated, and the last capacitor of the plurality of capacitors may be electrically connected between one end of the last secondary winding and the anode of the first diode of the second diode group.

A start point of the primary winding and those of the plurality of first secondary windings may be the same.

Each of the plurality of LED units may include at least one LED, at least one LED row in which a plurality of LEDs are connected in series, or a plurality of LED rows connected in parallel to each other.

The LED driving unit may further include: a detection unit detecting current flowing across each of the plurality of LED units.

The detection unit may include: at least one switch electrically connected in series to at least one LED or at least one LED row of each of the plurality of LED units; at least one resistor electrically connected in series to the at least one switch; and a comparator comparing a detected current detection value and a pre-set reference value.

The detection unit may transfer a detection value having the lowest value among currents flowing across the plurality of LED units to the feedback unit.

The power supply device may further include: a filter unit removing electromagnetic interference included in commercial AC power; a rectifying unit rectifying the filtered power from the filter unit; and a power factor correction unit correcting a power factor of the rectified power from the rectifying unit and transferring the same as the input power to the power conversion unit.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
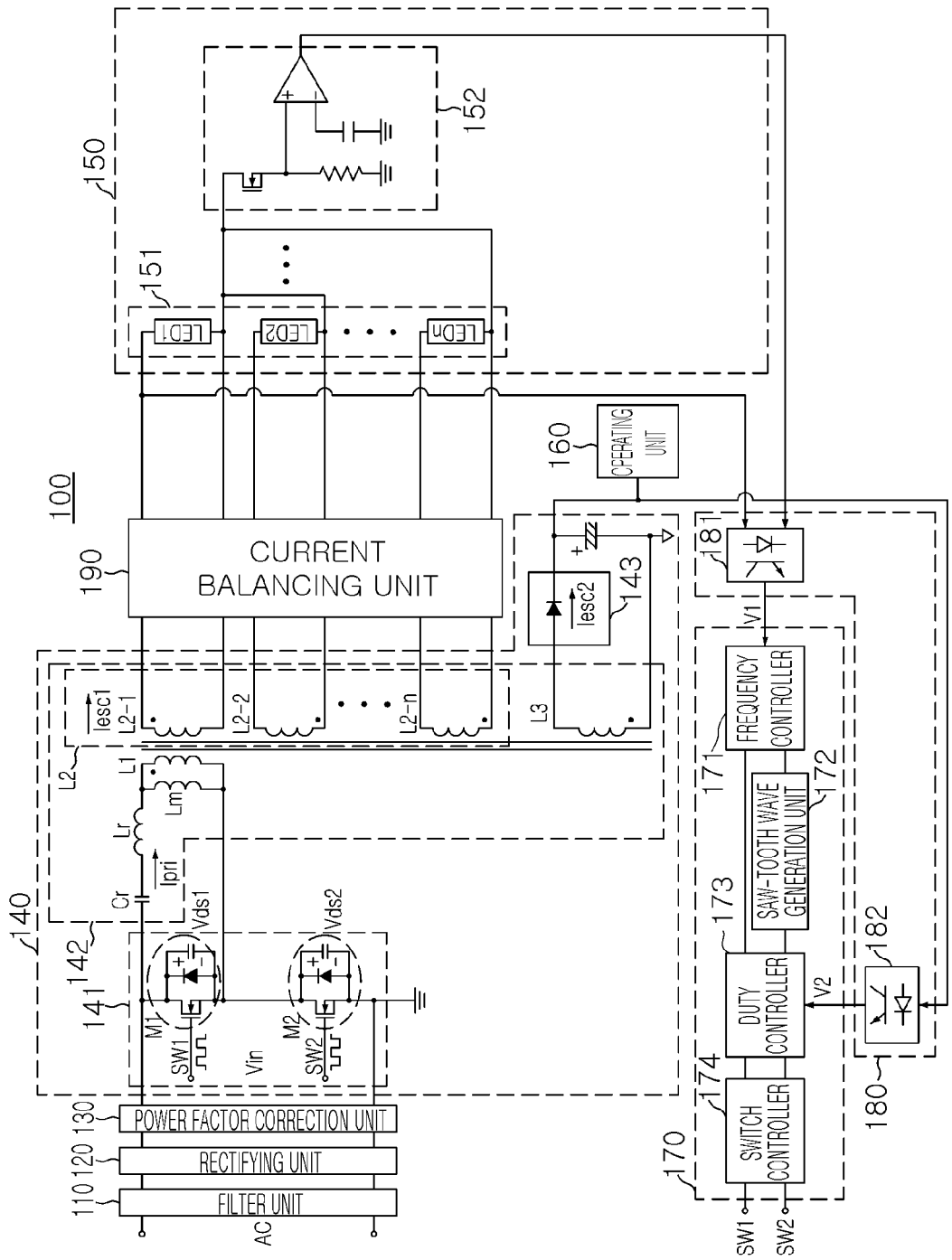
FIG. 1 is a schematic block diagram of a power supply device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of a power supply device according to an exemplary embodiment of the present invention.

With reference to FIG. 1, the power supply device 100 for driving a light emitting diode (LED) may include a filter unit 110 canceling electromagnetic interference (EMI) included in commercial AC power, a rectifying unit 120 rectifying the filtered power from the filter unit 110, a power factor correction unit 130 correcting a power factor by correcting a phase difference between the current and voltage of the rectified power from the rectifying unit 120, a power conversion unit 140, an LED driving unit 150, an operating unit 160, a power conversion controller 170, a feedback unit 180, and a current balancing unit 190.

The power conversion unit 140 may include a switching unit 141, a conversion unit 142, and a rectifying unit 143.

The switching unit 141 may include first and second switches M1 and M2 electrically connected in series and connected in parallel to an input DC power terminal and alternately switched according to switching signals sw1 and sw2 from the power conversion controller 170. The switched AC power from the switching unit 141 is transferred to the conversion unit 142.

The conversion unit 142 may be an LLC resonance type conversion unit including a resonance type capacitor Cr and a resonance type inductor Lr connected in series, and a magnetized inductor Lm connected in parallel to the first and second switches M1 and M2. In addition, the conversion unit 142 may be a single transformer having a primary winding L1, having a pre-set winding ratio, a first secondary winding group L2 including a plurality of first primary windings, and a second secondary winding L3. The foregoing magnetized inductor Lm may be configured only with leakage inductance of the foregoing transformer. Here, the first secondary winding group L2 and the second secondary winding L3 of the conversion unit 142 may output independent power, respectively.

The switched AC power from the switching unit 142 is converted into AC power having a voltage level according to a pre-set winding ratio of the conversion unit 142 and then transferred to the rectifying unit 143.

The rectifying unit 143 rectifies the AC power from the conversion unit 142 and outputs second power Vo2. In this case, a rectifying element of the rectifying unit 143 may be configured as having at least one diode to perform a half-wave rectification on the AC power, or may be configured as a bridge diode including a plurality of diodes to perform a full wave rectification on the AC power. The second power Vo2 from the rectifying unit 143 may be transferred to the operating unit 160 which performs a pre-set operation.

Upon receiving the second power Vo2, the operating unit 160 performs a pre-set operation. For example, when the power supply device for driving an LED according to an exemplary embodiment of the present invention is employed for a display device, the operating unit 160 may perform an operation to provide an image, a sound, and the like, required for the display device.

The switched AC power from the switching unit 141 is converted into a plurality of AC powers having a voltage level according to the pre-set winding ratio through the first secondary winding group L2 of the conversion unit 142 and also transferred to the current balancing unit 190.

The current balancing unit 190 rectifies the plurality of AC powers, maintains current balancing, and supplies the rectified AC powers to a plurality of LED units 151 of the LED driving unit 150, respectively. The current balancing unit 190 will be described in more detail later.

The LED driving unit 150 may include the plurality of LEDs 151 and a detection unit 152.

The plurality of LED units 151 may emit light upon receiving the plurality of first powers Vo1 from the current balancing unit 190, and in this case, the plurality of first powers Vo1 are directly transferred to the plurality of LED unit 151 without a boost circuit (or a voltage step-up circuit) or a buck circuit (or a voltage step-down circuit). Each of the plurality of LED units 151 may include at least one LED or an LED array in which a plurality of LEDs are connected in series.

The detection unit 152 may include a switch (S), a resistor (R), and a comparator OP.

Each of the plurality of LED units 151 may be connected in series to the switch (S), and the switch (S) may be switched to supply current to the plurality of LED units 151 or cut off a current supply to the plurality of LED units 151. Thus, the switch (S) may control dimming by controlling the supply of current flowing across the plurality of LED units 151. At least one resistor (R) is connected between the switch (S) and a ground to detect current flowing across the plurality of LED units 151, as a voltage value. The comparator OP may compare the detected voltage value with a pre-set reference value and transfer the comparison result to the feedback unit 180.

The feedback unit 180 may include a first photocoupler 181 and a second photocoupler 182. The detection result from the LED driving unit 150 may be transferred to the first photocoupler 181. In this case, a voltage level of the first power Vo1 supplied to the LED driving unit 150 and a current level flowing across the plurality of LED units 151 may be detected and transferred to the first photocoupler 181.

The second photocoupler 182 may receive a status value of the second power Vo2 supplied to the operating unit 160.

The power conversion controller 170 may control a power conversion operation of the power conversion unit 140 on the basis of the detection signal from the feedback unit 180.

The power conversion controller 170 may control the power conversion operation of the power conversion unit 140 to control constant current of the first and second powers Vo1 and Vo2 according to the detection signal from the feedback unit 180.

The power conversion controller 170 includes a frequency controller 171 receiving a first detection signal from the first photocoupler 181, a saw-tooth wave generation unit 172, a duty controller 173 receiving a first detection signal from the second photocoupler 182, and a switching controller 174. A detailed configuration of the foregoing power conversion controller 170 will now be described with reference to FIG. 2.

Figure 2:
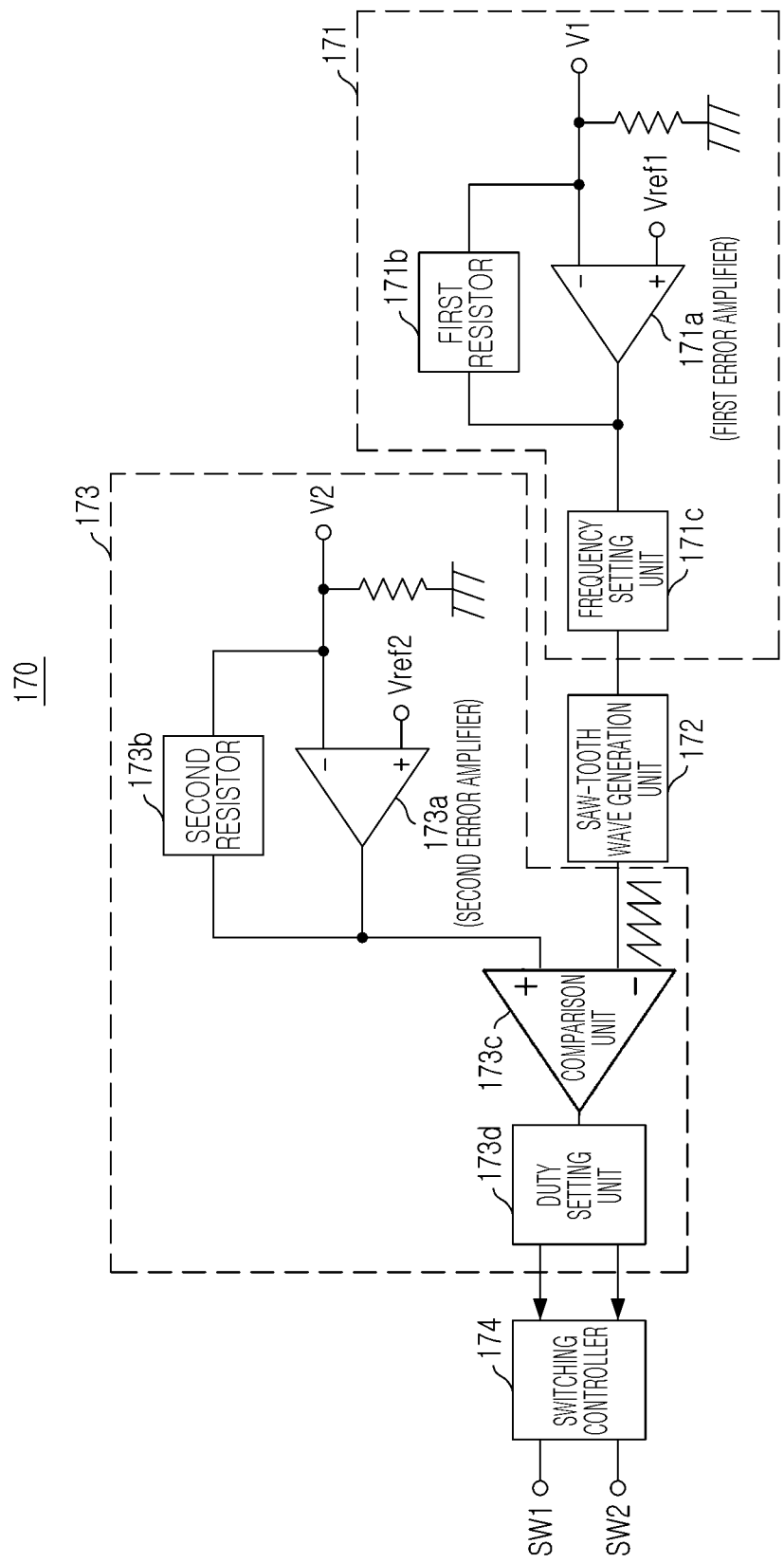
FIG. 2 is a schematic view showing an internal constitution of a power conversion controller employed for the power supply device according to an exemplary embodiment of the present invention.

FIG. 2 is a schematic view showing an internal constitution of a power conversion controller employed for the power supply device according to an exemplary embodiment of the present invention.

The frequency controller 171 of the power conversion controller 170 includes a first error amplifier 171a amplifying an error between a voltage level of the first detection signal from the first photocoupler 181 and that of a pre-set first reference voltage Vref1, a first resistor 171b setting an error amplification rate of the first error amplifier 171a according to a pre-set resistance value, and a frequency setting unit 171c setting the frequency according to the comparison result from the first error amplifier 171a. A frequency signal from the frequency setting unit 171c is transferred to the saw-tooth wave generation unit 172.

The saw-tooth wave generation unit 172 generates a saw-tooth wave in synchronization with the frequency signal from the frequency setting unit 171c. The saw-tooth wave is transferred to the duty controller 173.

The duty controller 173 includes a second error amplifier 173a amplifying an error between the voltage level of the second detection signal from the second photocoupler 182 and the voltage level of the pre-set second reference voltage Vref2, a second resistor 173b setting an error amplification rate of the second error amplifier 173a according to a pre-set resistance value, a comparator 173c comparing the voltage level of the comparison result of the second error amplifier 173a and the voltage level of the saw-tooth wave from the saw-tooth wave generation unit 172, and a duty setting unit 173d setting a switching duty according to the comparison result from the comparator 223. A duty signal from the duty setting unit 173d is transferred to the switching controller 174.

The switching controller 174 transfers first and second switching signals sw1 and sw2 for controlling switching of the first and second switches M1 and M2 to the switching unit 110 according to the duty signal from the duty setting unit 173d.

Figure 3:
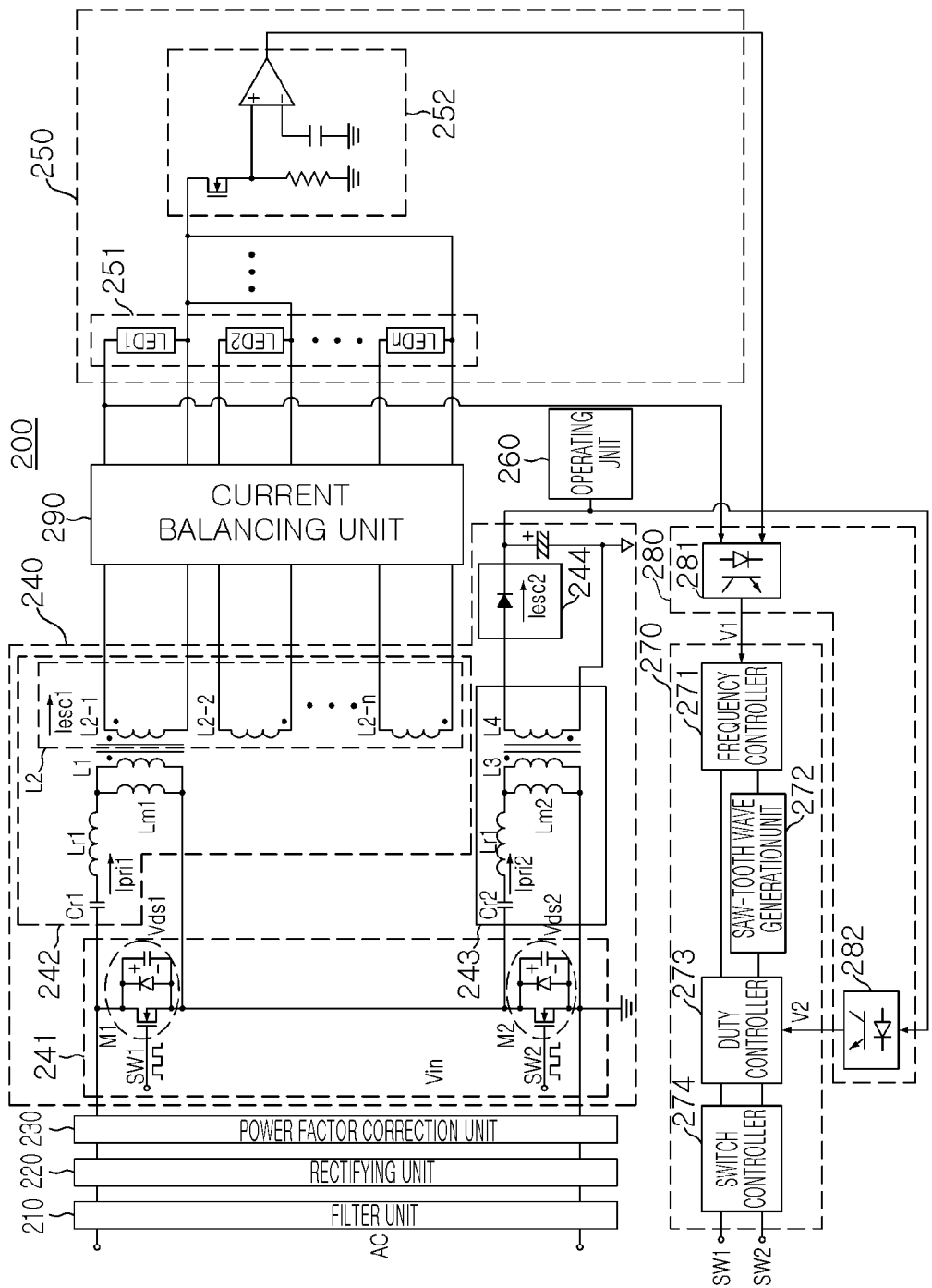
FIG. 3 is a schematic block diagram of a power supply device according to another exemplary embodiment of the present invention.

FIG. 3 is a schematic block diagram of a power supply device for driving an LED according to another exemplary embodiment of the present invention.

Only the configuration of the power conversion unit 240 of the power supply device 200 for driving an LED according to another exemplary embodiment of the present invention is different from the power supply device 100 illustrated in FIG. 1. Thus, an internal configuration and detailed description of the a filter unit 210, a rectifying unit 220, a power factor correction unit 230, first and second LED drivers 250 and 260, a power conversion controller 270, and a feedback unit 280 will be omitted.

The switching unit 241 of the power conversion unit 240 transfers power switched according to alternate switching of the first and second switches M1 and M2 to first and second conversion units 242 and 243. The first and second conversion units 242 and 243 may be LLC resonance type conversion units including resonance type capacitors Cr1 and Cr2 connected in series, resonance type inductors Lr1 and Lr2 connected in series, and magnetized inductors Lm1 and Lm2 connected in parallel to the first and second switches M1 and M2, respectively. In addition, first and second conversion units 242 and 243 may include two transformers having primary windings L1 and L3 and secondary windings L2 and L4 each having a pre-set winding ratio. The foregoing magnetized inductors Lm1 and Lm2 may be configured by the leakage inductance of the foregoing transformer.

Switched AC power from the switching unit 241 is converted into AC power having a voltage level according to a pre-set winding ratio of the first and second conversion units 242 and 243 and transferred to the rectifying unit 244 and a current balancing unit 290.

The rectifying unit 244 rectifies the AC power from the second conversion unit 243 and outputs the second power Vo2. In this case, a rectifying element of the rectifying unit 244 may be configured as at least one diode to perform a half-wave rectification on the AC power, or may be configured as a bridge diode including a plurality of diodes to perform a full wave rectification on the AC power. The second power Vo2 from the rectifying unit 244 may be transferred to the operating unit 260.

Figure 4:
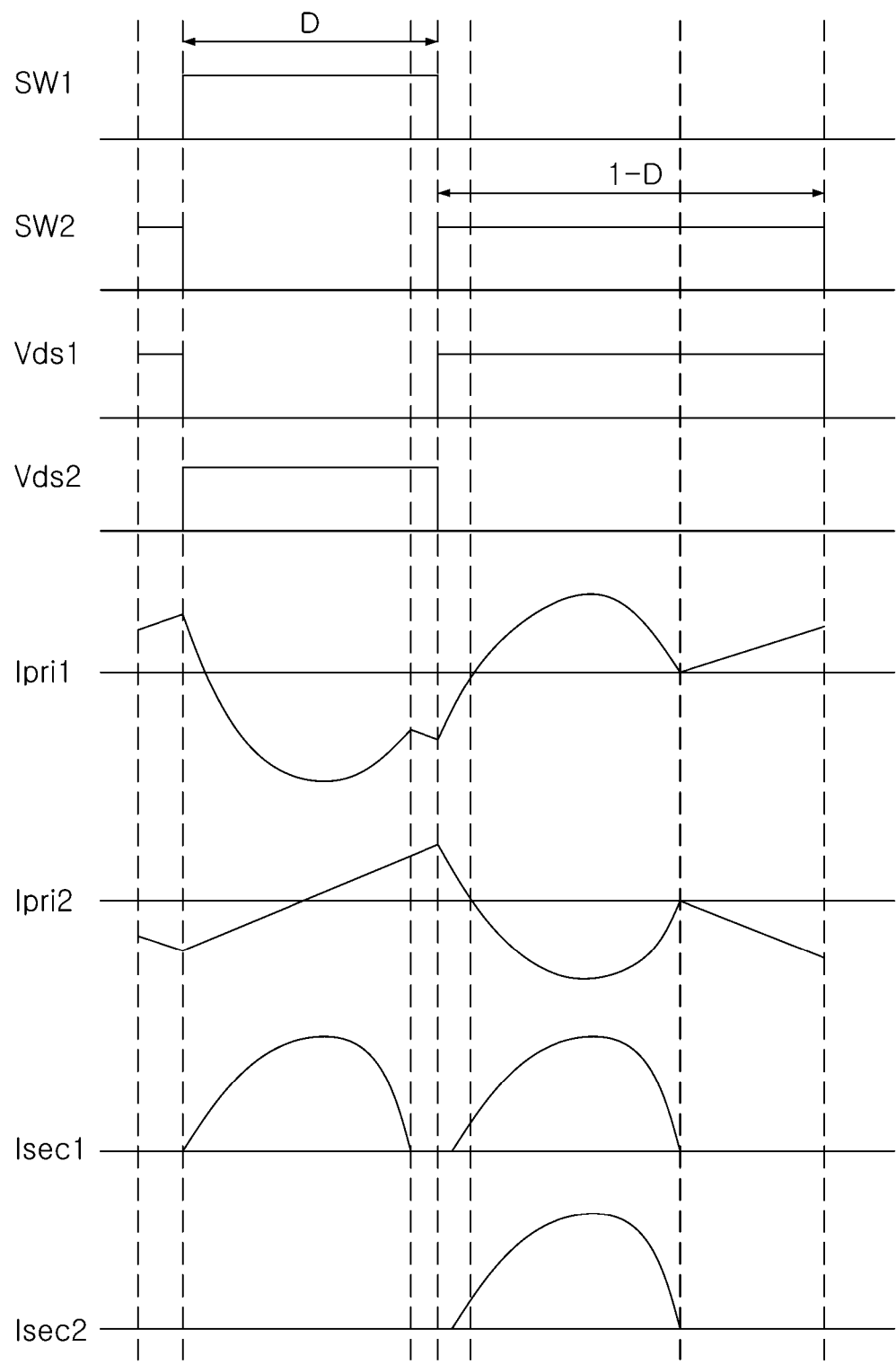
FIG. 4 illustrates operational waveforms of a major part of the power supply device according to an exemplary embodiment of the present invention.

FIG. 4 illustrates waveforms of a major part of the power supply device for driving an LED according to an exemplary embodiment of the present invention.

The operation of the power supply device for driving an LED according to an exemplary embodiment of the present invention will now be described in detail with reference to FIGS. 2 to 4. Here, the power supply device for driving an LED illustrated in FIG. 3 has been described, and the difference between the power supply devices of FIGS. 2 and 3 lies in that the power conversion unit includes one transformer or two transformers and the power supply device of FIG. 2 is the same as that of FIG. 3 except for a current Ipri2 introduced into the primary winding L3 of the second conversion unit 243. Thus, the following description will be based on the power supply device illustrated in FIG. 3.

First, the first and second switches M1 and M2 are alternately switched according to a switching of the power conversion controller 270, so as to be operated at duties of D, and 1-D, respectively. Accordingly, when the first and second switches M1 and M2 are switched off, voltages Vds1 and Vds2 are applied to the first and second switches M1 and M2.

As the voltage applied to the primary winding L1 of the first conversion unit 242 is controlled by regulating a charged voltage of the first resonance type capacitor Cr1 through the alternative ON/OFF switching of the foregoing first and second switches M1 and M2, the plurality of first powers Vo1 are formed through the first secondary winding group L2 of the first conversion unit 242 and the current balancing unit 290.

In this case, the first DC power Vo1 is precisely formed through a frequency controller 271 that modulates a switching frequency.

Also, as the voltage applied to the primary winding L3 of the second conversion unit 243 is controlled by regulating a charged voltage of the second resonance type capacitor Cr2 through the alternative ON/OFF switching of the first and second switches M1 and M2, the second power Vo2 is formed through the second secondary winding group L4 of the second conversion unit 243 and the diode of the rectifying unit 244.

A multi-output DC/DC converter according to an exemplary embodiment of the present invention includes the frequency converter 271 controlling an output voltage on the basis of the first detection signal and a duty controller 273 controlling an output voltage on the basis of the second detections signal.

Here, the duty controller 273 that performs pulse width modulation is synchronized with the switching frequency of the frequency controller 271 changing on the basis of the first power Vo1, so switching frequency and the pulse width modulation take place simultaneously.

The frequency controller 271 of the power conversion controller 270 compares the voltage level of the first detection signal from the first photocoupler and the voltage level of the pre-set first reference voltage Vref1 through a first error amplifier 171a, and transfers a frequency signal having the frequency varying according to the comparison results to the saw-tooth wave generation unit 272 through the frequency setting unit 171c.

The saw-tooth wave generation unit 272 forms a saw-tooth wave synchronized with the varying frequency of the frequency signal. The duty controller 273 compares the voltage level of the second detection signal from the second photocoupler 282 and the pre-set second reference voltage Vref2 through the second error amplifier 173a and compares the error results from the second error amplifier 173a and the saw-tooth wave from the saw-tooth wave generation unit 272 to form a duty signal through the duty setting unit 173d, and then transfers the duty signal to the switching controller 274. The switching controller 274 transfers the first and second switching signals sw1 and sw2 to the switching unit 241 according to the duty signal to control the switching of the first and second switches M1 and M2.

In more detail, as the voltage applied to the primary winding L1 of the first conversion unit 242 is controlled by regulating a charged voltage of the first resonance type capacitor Cr1 through the alternative ON/OFF switching of the foregoing first and second switches M1 and M2, the plurality of first powers Vo1 are formed through the first secondary winding group L2 of the first conversion unit 242 and the current balancing unit 290.

In this case, when the voltage level of the first power Vo1 is desired to be increased, the switching frequency is adjusted down through the frequency controller 271 that modulates a switching frequency, and in this case, when the switching frequency is reduced, a voltage gain is increased in terms of the characteristics of the LLC resonance type, so the voltage level of the first power Vo1 is increased.

Here, each of the plurality of first secondary windings L2-1 to L2-n is connected to a capacitor (not shown) of the current balancing unit 290, so that when the duty, which is generated on the basis of the second power Vo2, is unbalanced, a phenomenon in which the resonance current generated from the first conversion unit 242 passes through the path of only the diode of the current balancing unit 290 can be eliminated. Namely, the plurality of first secondary windings L2-1 to L2-n connected to the capacitor of the current balancing unit 290 prevent a half-wave rectification due to the unbalanced duty.

Meanwhile, when the voltage level of the second power Vo2 is changed according to a change in the load of the second power Vo2, a duty-ON period of the switch having a direct connection with the second power Vo2 is controlled. Here, an operation duty (D) having a direct connection with the second power Vo2 is applied to the first switch M1. When the voltage level of the second power Vo2 is increased, the operation duty (D) is reduced due to the controlling of pulse width modulation, but because of this, the switching frequency is not changed. Thus, even when the operation duty (D) is adjusted by adjusting the voltage level of the second power Vo2, the voltage level of the first power Vo1 is not changed. Namely, the first power Vo1 and the second power Vo2 are independently controlled.

Figure 5:
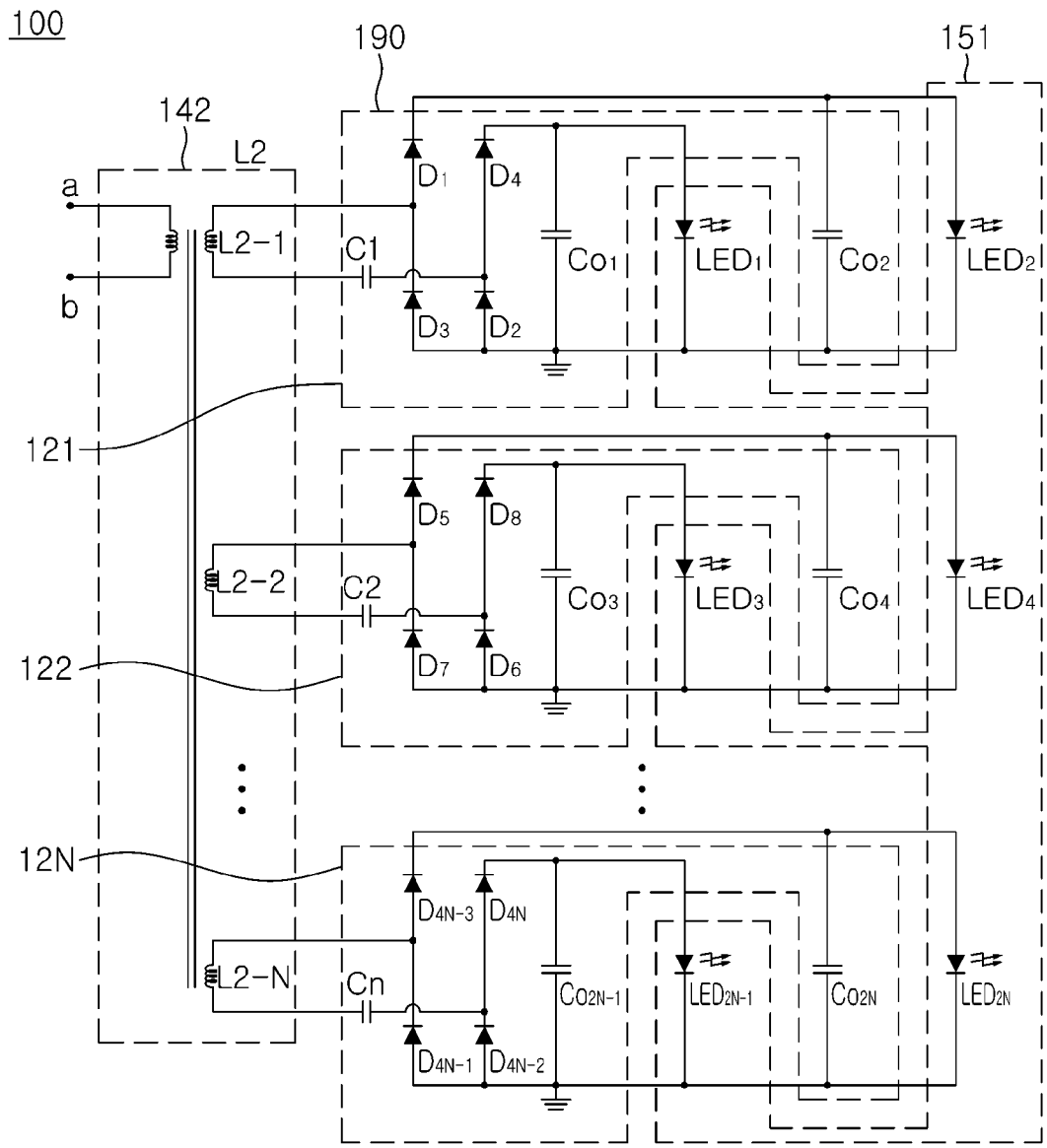
FIG. 5 is a schematic view showing an internal constitution of a current balancing unit employed for the power supply device according to an exemplary embodiment of the present invention.

FIG. 5 is a schematic view showing an internal constitution of the current balancing unit employed for the power supply device according to an exemplary embodiment of the present invention.

The current balancing unit 190 will now be described in detail with reference to FIG. 5.

The current balancing unit 190 may include a plurality of rectifiers 121 to 12N (N is a natural number). For example, the plurality of rectifiers may be at least two rectifiers 121 and 122, or without being limited thereto, the rectifiers may be four or six rectifiers matched in a one-to-one manner to the number of secondary windings of the plurality of secondary windings as described above. The plurality of rectifiers 121 to 12N have the same configuration, so the rectifier configuration in the case that two rectifiers 191 and 192 are included will now be described.

The first and second rectifiers 121 and 122 may be electrically connected to the first and second secondary windings L2-1 and L2-2 of the first secondary winding group L2.

The first and second rectifiers 121 and 122 may include capacitors C1 and C2, rectifying diode groups D1 to D8, and stabilization capacitors Co1 to Co4, respectively.

Namely, the first rectifier 121 includes the first capacitor C1 electrically connected in series between one end of the first first secondary winding L2-1 and the rectifying diode group D1~D4, a first rectifying diode group having the first to fourth rectifying diodes D1~D4, and first and second stabilization capacitors Co1 and Co2 supplying rectified power to each of the LED units LED1 and LED2.

Similarly, the second rectifier 122 includes the second capacitor C2 electrically connected in series between one end of the second first secondary winding L2-2 and the rectifying diode group D5-D8, a second rectifying diode group having the first to fourth rectifying diodes D5~D8, and third and fourth stabilization capacitors Co3 and Co4 supplying rectified power to each of the LED units LED3 and LED4.

In detail, the first capacitor C1 is electrically connected in series between one end of the first first secondary winding L2-1 and an anode of the first rectifying diode D1, the anode of the first rectifying diode D1 is electrically connected to the first capacitor C1 and a cathode of the third rectifying diode D3, a cathode of the first rectifying diode D1 is electrically connected to one end of the second stabilization capacitor Co2 and one end of the second LED lamp LED2, a cathode of the second rectifying diode D2 and an anode of the fourth rectifying diode D4 are electrically connected with the other end of the first first secondary winding L2-1, a cathode of the fourth rectifying diode D4 is electrically connected to one end of the first stabilization capacitor Co1 and one end of the first LED lamp LED1, and the other ends of the first and second stabilization capacitors Co1 and Co2, the other ends of the first and second LEDs LED1 and LED2, and anodes of the second and third rectifying diodes D2 and D3 are grounded.

Similarly, the second capacitor C2 is electrically connected in series between one end of the second first secondary winding L2-2 and an anode of the first rectifying diode D5, the anode of the first rectifying diode D5 is electrically connected to the second capacitor C2 and a cathode of the third rectifying diode D7, a cathode of the first rectifying diode D5 is electrically connected to one end of the fourth stabilization capacitor Co4 and one end of the fourth LED lamp LED4, a cathode of the second rectifying diode and an anode of the fourth rectifying diode D8 are electrically connected with the other end of the second first secondary winding L2-2, a cathode of the fourth rectifying diode D8 is electrically connected to one end of the third stabilization capacitor Co2 and one end of the third LED lamp LED3, and the other ends of the third and fourth stabilization capacitors Co3 and Co4, the other ends of the third and fourth LED lamps LED3 and LED4, and anodes of the second and third rectifying diodes D6 and D7 are grounded.

The rectifiers 121 to 12N included in the rectifying unit 120 may have various configurations.

Figure 6A:
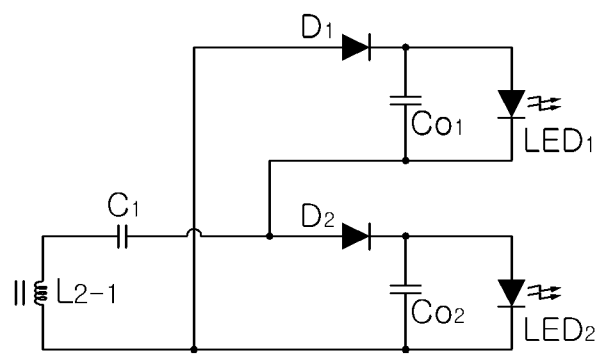
FIGS. 6(a) and 6(b) illustrate examples of rectifiers employed for the current balancing unit according to an exemplary embodiment of the present invention.
Figure 6B:
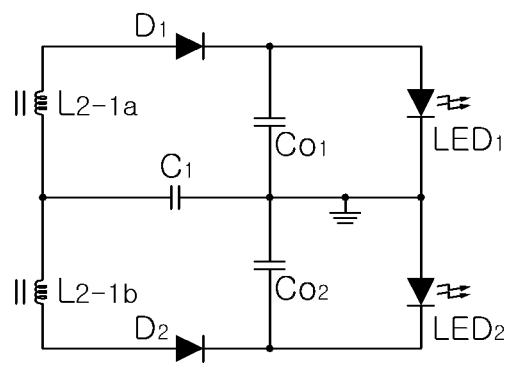

FIGS. 6(a) and 6(b) show various embodiments of the rectifiers employed for the current balancing unit.

As discussed above, the configurations of the plurality of rectifiers 121 to 12N are the same, so the embodiment of one of the rectifiers will now be described.

With reference to FIG. 6(a), the rectifying diode group of the rectifier includes first and second rectifying diodes D1 and D2, the first capacitor C1 is electrically connected in series between one end of the first first secondary winding L2-1 and the anode of the second rectifying diode D2, the anode of the first rectifying diode D1 is electrically connected to the other end of the first first secondary winding L2-1, the cathode of the first rectifying diode D1 is electrically connected to one end of the first stabilization capacitor Co1 and one end of the first LED unit LED1, the anode of the second rectifying diode D2 is electrically connected to the other end of the first stabilization capacitor Co1 and the other end of the first LED unit LED1 along with the first capacitor C1, the cathode of the second rectifying diode D2 is electrically connected to one end of the second stabilization capacitor Co2 and one end of the second LED lamp LED2, and the other end of the second stabilization capacitor Co2 and the other end of the second LED unit LED2 are electrically connected to the other end of the first first secondary winding L2-1.

With reference to FIG. 6(b), the first first secondary winding L2-1 is dividedly-wound (L2-1a,L2-1b) to have a center tap, the first capacitor C1 is connected in series between the center tap of the first first secondary winding L2-1 and a ground, the first rectifying diode group includes first and second rectifying diodes D1 and D2, the anode of the first rectifying diode D1 is electrically connected to one end of the first first secondary winding L2-1, the cathode of the first rectifying diode D1 is electrically connected to one end of the first stabilization capacitor Co1 and one end of the first LED unit LED1, the anode of the second rectifying diode D2 is electrically connected to the other end of the first first secondary winding L2-1, the cathode of the second rectifying diode D2 is electrically connected to one end of the second stabilization capacitor Co2 and one end of the second LED unit LED2, and the other ends of the first and second stabilization capacitors Co1 and Co2 and the other ends of the first and second LED units LED1 and LED2 are grounded.

The plurality of first secondary windings L may include at least two secondary windings, and may include secondary windings in multiples of 2, such as four, six and eight secondary windings. In addition, the number of windings of each of the secondary windings may be equal. Thus, each of the plurality of first secondary windings L2-1 to L2-n is electromagnetically coupled with the primary winding L1 equally, so current balancing can be made among power outputs from the respective first secondary windings.

This will now be described in more detail with reference to the accompanying drawings.

Figure 7A:
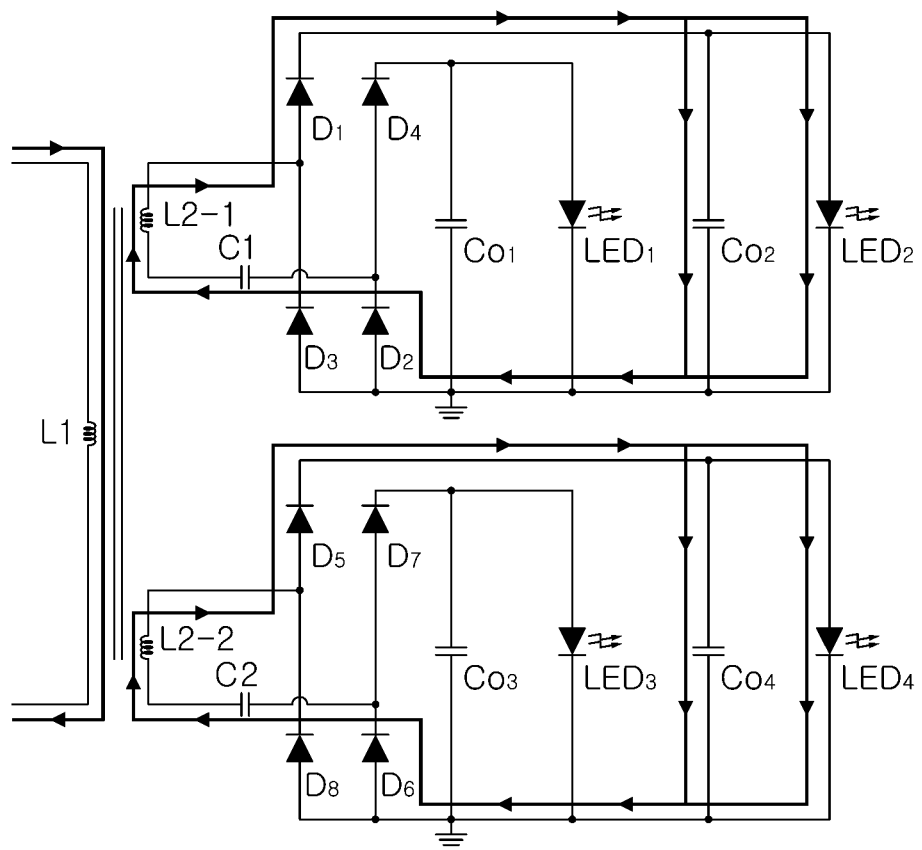
FIGS. 7a and 7b illustrate operations of the current balancing unit of FIG. 5.
Figure 7B:
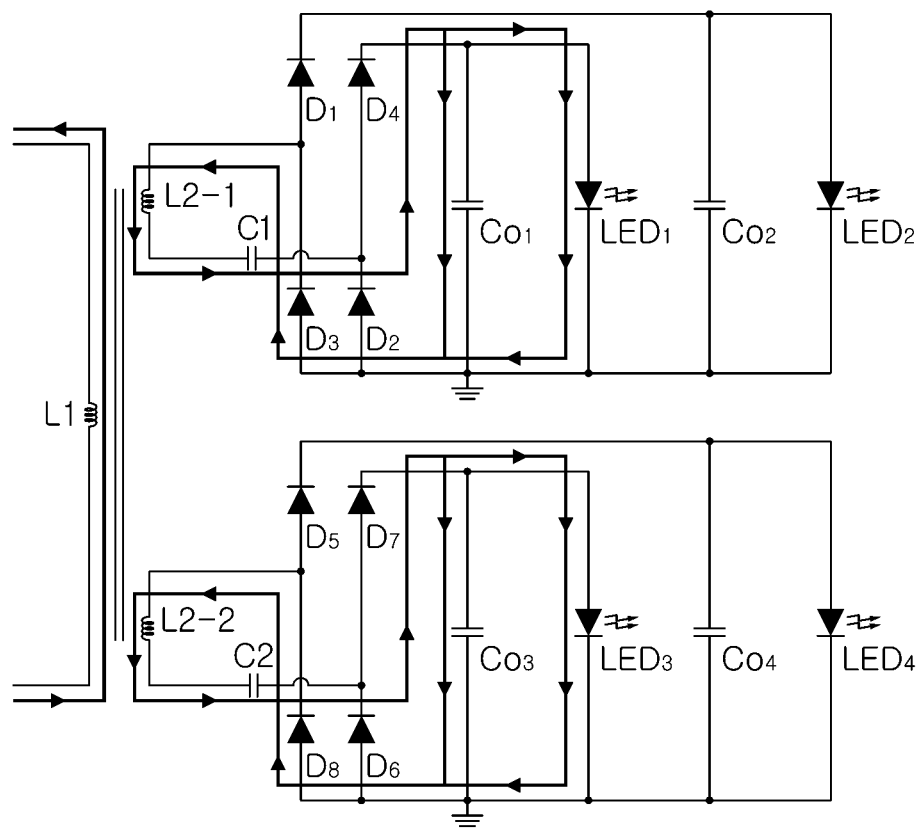

FIGS. 7a and 7b illustrate operations of the current balancing unit of FIG. 5.

As shown in FIGS. 7a and 7b, the current flowing in the primary winding L1 according to the switching of the switching unit 141 flows in a forward direction (FIG. 7a) and in a reverse direction (FIG. 7b) alternately. In this case, when the winding numbers of the first and second first secondary windings L2-1 and L2-2 are equal, in the case of the forward direction, the currents (Isec1_P,Isec2_P) of positive power of the first and second first secondary windings L2-1 and L2-2 can be approximately equal as represented by Numerical formula 1 shown below:

$$Isec1\_P \approx Isec2\_P \; (*P \; Positive) \quad \text{[Numerical formula 1]}$$

Similarly, in the case of the reverse direction, the currents (Isec1_N,Isec2_N) of negative power of the first and second first secondary windings L2-1 and L2-2 can be approximately equal as represented by Numerical formula 2 shown below:

$$Isec1\_N \approx Isec2\_N \; (*N: Negative) \quad \text{[Numerical formula 2]}$$

In this case, each rectifier may have one capacitor C1 or C2, and as shown in FIGS. 7a and 7b, the forward and reverse current flow paths are formed and power supplied to the first and third LED lamps LED1 and LED2 and power supplied to the second and fourth LED lamps LED2 and LED4 can be approximately equal, according to the charge balance law of the capacitors C1 and C2 (The charge balance law is a conventionally known art, so a detailed description thereof will be omitted).

$$Isec1,2\_P \approx Isec1,2\_N \quad \text{[Numerical formula 3]}$$

$$Isec1\_P \approx Isec2\_P \approx Isec1\_N \approx Isec2\_N \quad \text{[Numerical formula 4]}$$

Namely, the current of the first power Vo1 supplied to the first to fourth LED units LED1 to LED 4 can be uniformly maintained.

In another embodiment of the foregoing configuration, when one transformer includes N number of secondary windings each having the same winding number, current balancing of driving power supplied to at least 2N number of LED units can be maintained according to the charge balance law of the N (N is a positive even number) number of capacitors provided to be matched to the respective secondary windings, so a uniform current can flow to each of the LED lamps.

As described above, the secondary windings in multiples of two have the same winding number to thus maintain the current balancing of the driving powers output from the respective secondary windings, and also, the current balancing of the driving powers supplied to the at least two LED lamps is maintained by the single capacitor. Thus, without employing a DC/DC converter and a control terminal, which have previously been necessarily employed for controlling the constant current of LED lamps, the driving power can be supplied to the LED lamps of multiple channels by the single transformer, thus increasing power conversion efficiency and reducing manufacturing costs and a product volume. In addition, because driving power is supplied to the LED lamps of multiple channels by the single transformer and the current balancing of the driving powers supplied to the respective LED lamps is maintained, the constant current flowing at the respective LED lamps can be controlled.

Figure 8:
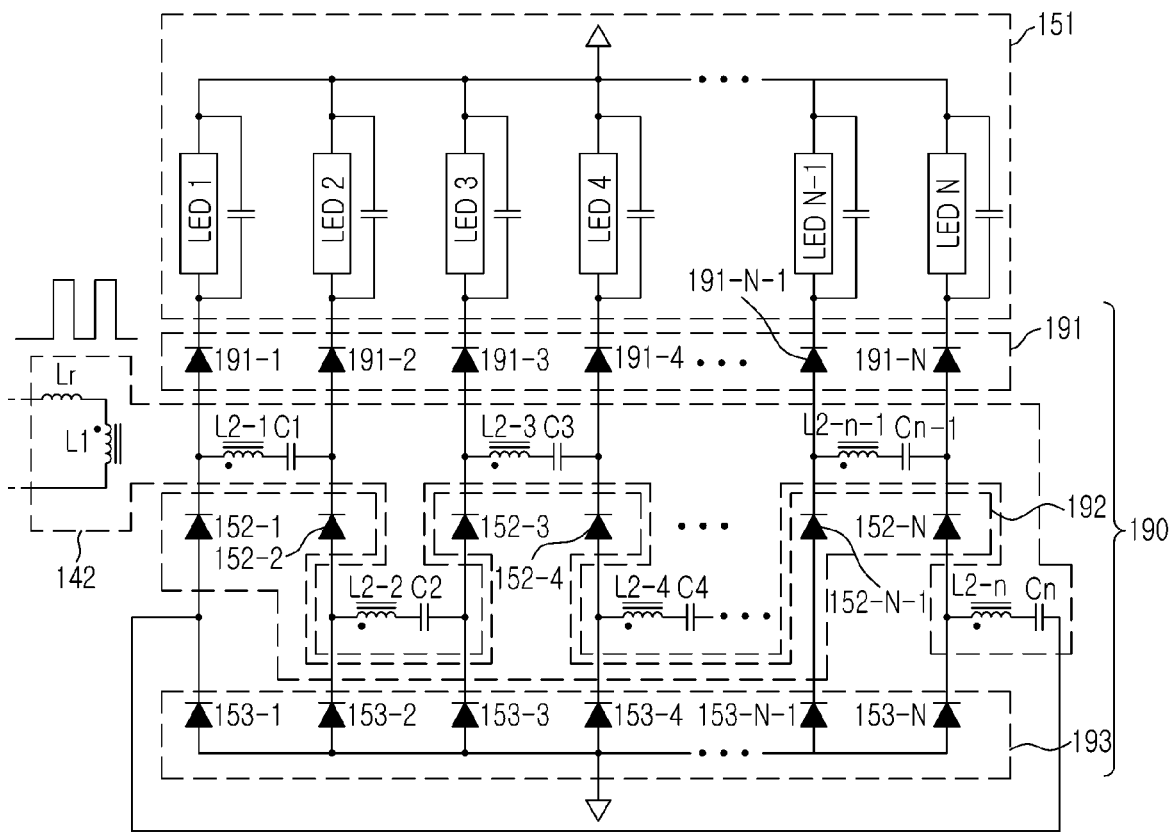
FIG. 8 is a schematic view showing an internal constitution of a current balancing unit employed for the power supply device according to another exemplary embodiment of the present invention.

FIG. 8 is a schematic view showing an internal constitution of a current balancing unit employed for the power supply device according to another exemplary embodiment of the present invention.

The current balancing unit 190 may include one primary winding L1, a plurality of first secondary windings L2-1 to L2-n, and a plurality of capacitors C1 to CN.

One primary winding L1 may receive switched power from the switching unit 141. The switched power from the switching unit is AC power, so one period may include a positive half period and a negative half period.

The plurality of first secondary windings L2-1 to L2-n may have a pre-set winding ratio with respect to the primary winding L1, and they may receive power from the primary winding L1 according to the pre-set winding ratio and transfer the received power to the plurality of LED units 151. A start point of the winding of the plurality of first secondary windings L2-1 to L2-n and that of the primary winding L1 may be the same.

In this case, the plurality of first secondary windings L2-1 to L2-n may transfer power to different LED units among the plurality of the LED units 151 during the positive half period and the negative half period, respectively. Namely, the plurality of first secondary windings L2-1 to L2-n may transfer power to the odd numbered LED units among the plurality of LED units 151 during the positive half period and may transfer power to the even numbered LED units among the plurality of LED units 151. Thus, preferably, the plurality of LED units 151 are provided as an even number of LED units 151.

Current balancing between the positive half period and the negative half period of the power transferred by the plurality of first secondary windings L2-1 to L2-n may be based on the charge balance law of the plurality of capacitors C1 to CN. Thus, the plurality of capacitors C1 to CN may be electrically connected to the plurality of first secondary windings L2-1 to L2-n in a one-to-one manner.

The path providing unit may provide a power transmission path of the plurality of first secondary windings L2-1 to L2-n as described above. To this end, the path providing unit may include first to third diode groups 191, 192, and 193. The first to third diode groups 191 to 193 may include a plurality of diodes, respectively.

The plurality of diodes of the first diode group 191 may be electrically connected to the plurality of LED units 151 in a one-to-one manner. Namely, the cathodes of the plurality of diodes of the first diode group 191 may be electrically connected to one end of each of the plurality of LED units 151.

The plurality of diodes of the second diode group 192 may be connected in series to the plurality of diodes of the first diode group 191 in a one-to-one manner, and the plurality of diodes of the third diode group 193 may be connected in series to the plurality of diodes of the second diode group 192 in a one-to-one manner.

Namely, the cathodes of the plurality of diodes of the second diode group 192 may be electrically connected to anodes of corresponding diodes among the plurality of diodes of the first diode group 191, the cathodes of the plurality of diodes of the third diode group 193 may be electrically connected to anodes of corresponding diodes among the plurality of diodes of the second diode group 192, and anodes of the plurality of diodes of the third diode group 193 may be grounded.

The first to third diode groups 191 to 193 of the path providing unit may be electrically connected to the plurality of first secondary windings L2-1 to L2-n and the plurality of capacitors C1 to CN.

Accordingly, the odd numbered first secondary windings (L2-1, L2-3, . . . , L2-n−1) among the plurality of first secondary windings L2-1 to L2-n may be electrically connected between the anodes of the two adjacent diodes among the plurality of diodes of the first diode group 191, and the even numbered first secondary windings (L2-2, L2-4, . . . , L2-n) among the plurality of first secondary windings L2-1 to L2-n may be electrically connected between the anodes of the two adjacent diodes among the plurality of diodes of the second diode group 192.

In detail, the first first secondary winding L2-1 among the plurality of first secondary windings L2-1 to L2-n is electrically connected between the anodes of the first and second diodes 191-1 and 191-2 among the plurality of diodes of the first diode group 191, and the first capacitor C1 among the plurality of capacitors C1 to CN is electrically connected between the first first secondary winding L2-1 and the anode of the second diode 191-2.

The second first secondary winding L2-2 among the plurality of first secondary windings L2-1 to L2-n is electrically connected between the anodes of the second and third diodes 192-2 and 192-3 among the plurality of diodes of the second diode group 192, and in this case, the second capacitor C2 among the plurality of capacitors C1 to CN is electrically connected between the second first secondary winding L2-2 and the third diode 192-3. The other remaining plurality of first secondary windings L2-1 to L2-n and the other remaining plurality of capacitors C3 to CN-1 repeatedly have the foregoing connection relationships so as to be connected with the plurality of diodes of the first diode group 191 or the second diode group 192.

In this case, the Nth first secondary winding L2-n is electrically connected between the anodes of the Nth and first diodes 192-N and 192-1 among the plurality of diodes of the second diode group, and the Nth capacitor CN is electrically connected between the Nth first secondary winding L2-n and the first diode 192-1.

Figure 9A:
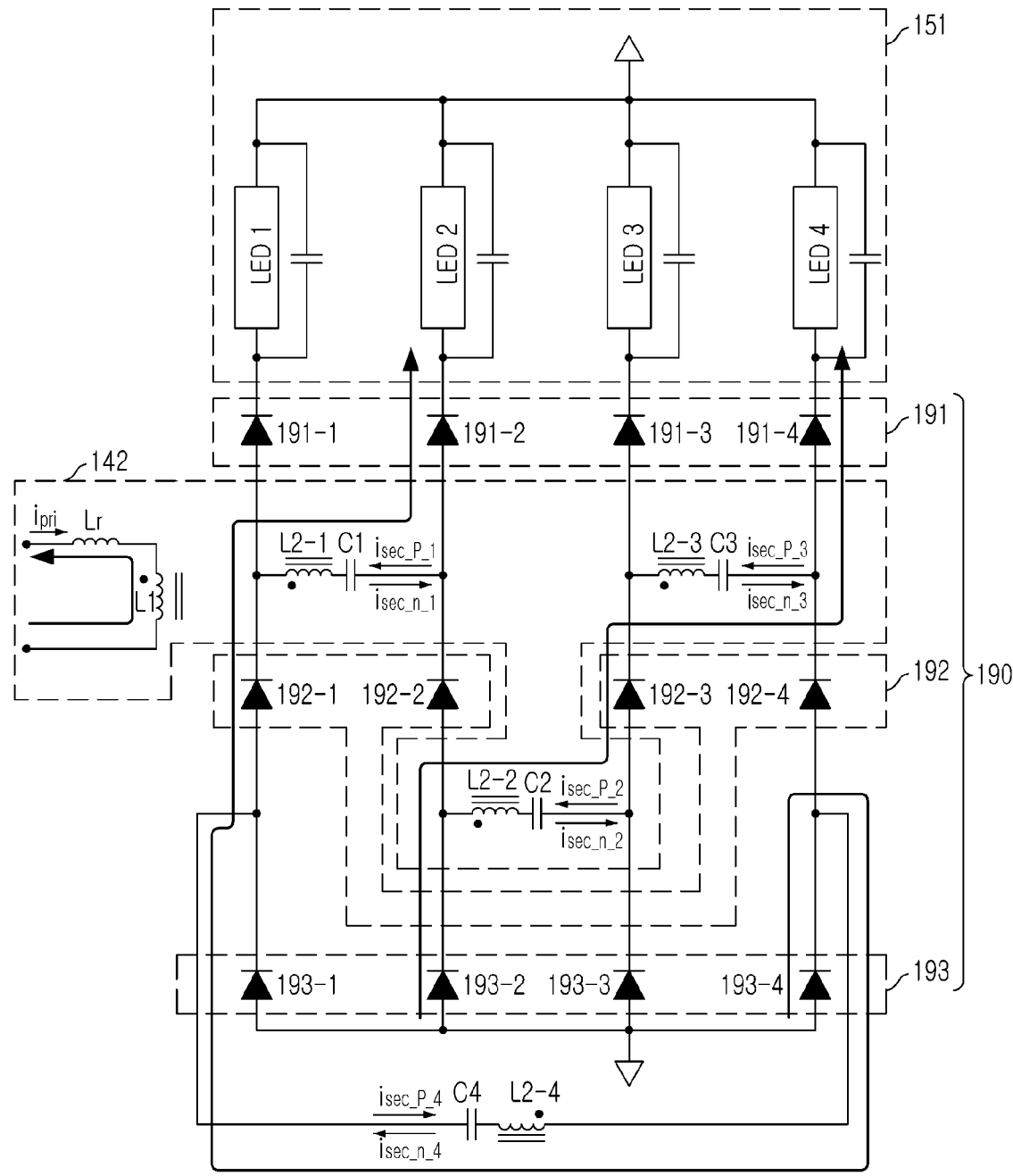
FIGS. 9a and 9b illustrate operations of the current balancing unit of FIG. 8.
Figure 9B:
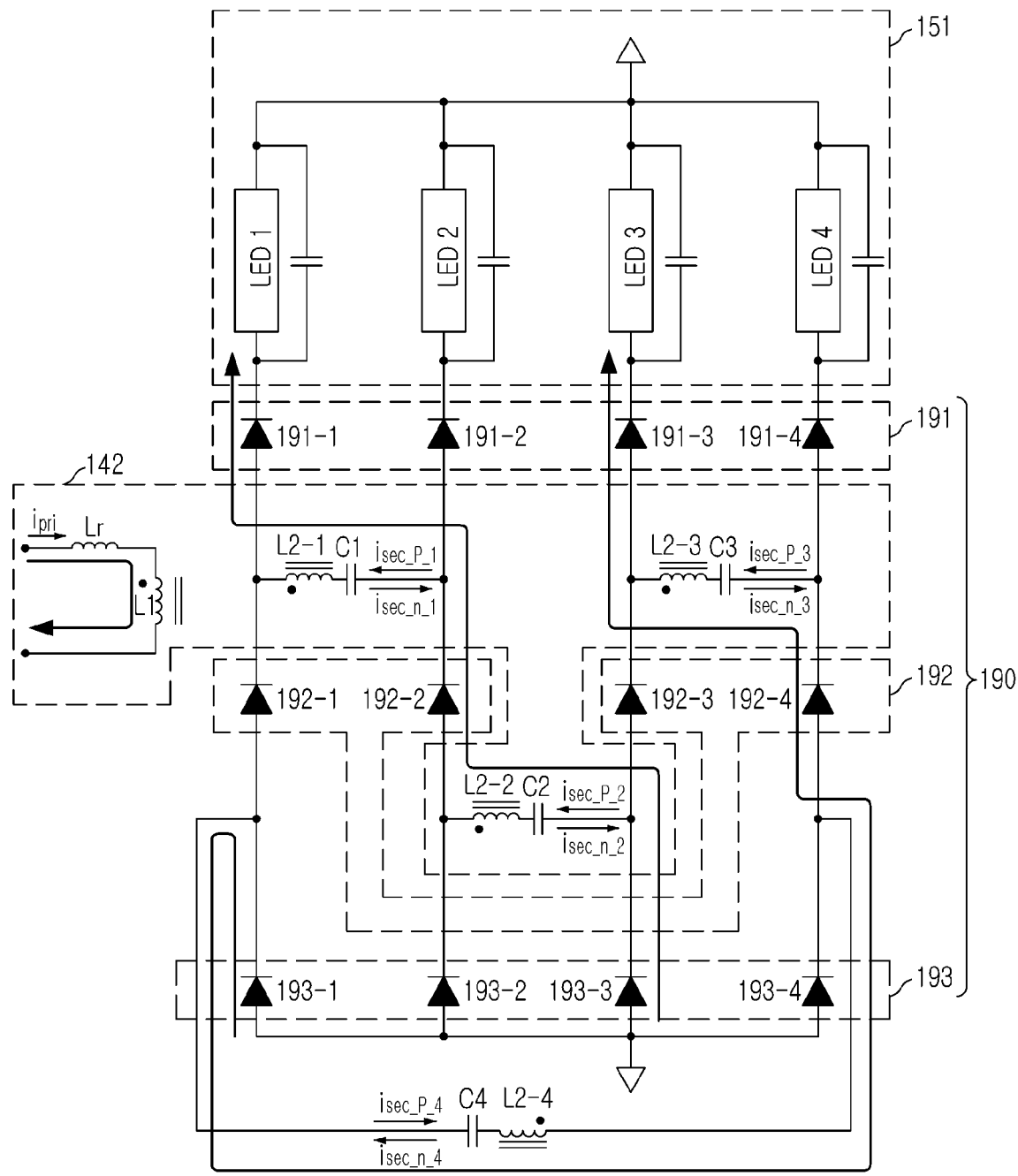

FIGS. 9a and 9b illustrate operations of the current balancing unit of FIG. 8. The plurality of LEDs 151 according to an exemplary embodiment of the present invention includes a total of four LED units LED1 to LED 4. Accordingly, the first to fourth first primary windings L2-1 to L2-4 and the first to fourth capacitors C1 to C4 are employed, and the first to third diode groups 191 to 193 are configured to include the first to fourth diodes 191-1~191-4, 192-1~193-4, 193-1~194-4, respectively. However, the configuration of the power supply device for driving an LED according to an exemplary embodiment of the present invention is not limited thereto.

With reference to FIG. 9a, when a current ($i_{pri}$) flows to the primary winding L1 during a positive half period of the switched power as indicated by an arrow, because the start point of the winding of the first to fourth first secondary windings L2-1 to L2-4 is the same as that of the winding of the primary winding L1, the first and third diodes 191-1 and 191-3 of the first diode group, the second and fourth diodes 192-2 and 192-4 of the second diode group 192, and the first and third diodes 193-1 and 193-3 of the third diode group 193 are electrically connected to supply power to the first and third LED units LED1 and LED3.

The current at this time can be established as represented by Numerical formula 1 shown below:

$$i_{sec\_P\_1} = i_{sec\_P\_2} = i_{LED1}, \quad i_{sec\_P\_3} = i_{sec\_P\_4} = i_{LED3}$$ [Numerical formula 1]

Meanwhile, as shown in FIG. 9b, when the current ($i_{pri}$) flows to the primary winding L1 during a negative half period of the switched power in the opposite direction from that illustrated in FIG. 9, as indicated by an arrow.

because the start point of the winding of the first to fourth first secondary windings L2-1 to L2-4 is the same as that of the winding of the primary winding L1, the second and fourth diodes 191-2 and 191-4 of the first diode group, the first and third diodes 192-1 and 192-3 of the second diode group 192, and the second and fourth diodes 193-2 and 193-4 of the third diode group 193 are electrically connected to supply power to the second and fourth LED units LED2 and LED4.

$$i_{sec\_N_1} = i_{sec\_N\_4} = i_{LED2}, i_{sec\_N\_2} = i_{sec\_N\_3} = i_{LED4}$$ [Numerical formula 2]

In this case, because the capacitors C1 to C4 are electrically connected to the first to fourth first secondary windings L2-1 to L2-4, a DC offset average value of the entire current is 0 according to the charge balance law, so the following Numerical formula 3 can be established $$i_{sec\_P\_1} = i_{sec\_N\_1}, i_{sec\_P\_2} = i_{sec\_N\_2}, i_{sec\_P\_3} = i_{sec\_N\_3}, i_{sec\_P\_4} = i_{sec\_N\_4}$$ [Numerical formula 3]

Accordingly, the current supplied to the first to fourth lamps according to the Numerical formula 1 to 3 can be equally controlled as represented by Numerical formula 4 shown below:

$$<i_{sec\_P\_1}> = <i_{sec\_N\_1}> = <i_{sec\_P\_2}> = i_{sec\_N\_2} = i_{sec\_P\_3} = <i_{sec\_N\_3}> = <i_{sec\_P\_4}> = <i_{sec\_N\_4}> = i_{LED\,1} = I_{LED\,2} = i_{LED\,3} = i_{LED\,4}$$ [Numerical formula 4]

When Numerical formula 4 is substituted for the configuration having the first to Nth LED units LED1 to LEDN illustrated in FIG. 1, The current supplied to the entire lamps can be equally controlled as represented by Numerical formula 5 shown below:

$$<i_{sec\_P\_k}> <i_{sec\_N\_k}> = i_{LED,k}\ k=1, 2, \ldots n$$ [Numerical formula 5]

As described above, according to the exemplary embodiments of the present invention, because such complicated driving circuit and a DC/DC converter as in the related art are not required to control the constant current supplied to the lamps, particularly, to the LEDs and current balancing, the manufacturing costs thereof can be reduced, and the reduction in the volume of the circuits can increase the power density to advantageously lead to a reduction in size, and because the passive elements are provided, the reliability of the product can be improved.

As set forth above, according to exemplary embodiments of the invention, because the switching of multiple output powers is controlled in synchronization with the frequency of one of the multiple output powers and the power conversion stage is simplified in supplying power for driving an LED, a power conversion efficiency can be increased and an increase in a fabrication cost otherwise resulting from an increase in the number of components can be restrained.

In addition, in the case of supplying power to an LED group and a display operation circuit, power can be continuously supplied to the operation circuit, even if there is no feedback signal from the LED group.

While the present invention has been shown and described in connection with the exemplary embodiments, it will be apparent to those skilled in the art that modifications and variations can be made without departing from the spirit and scope of the invention as defined by the appended claims.

What is claimed is:

1. A power supply device for driving a light emitting diode (LED), the device comprising:
    a power conversion unit converting an input power into a plurality of first powers according to a pre-set first conversion scheme and converting the input power into a second power according to a second conversion scheme set to be different from the first conversion scheme;
    a current balancing unit maintaining current balancing of the plurality of first powers from the power conversion unit;
    an LED driving unit supplying the plurality of first powers maintained in current balancing by the current balancing unit to a plurality of LED units, respectively, and detecting a power and a current supplied to the LED units;
    an operating unit performing a pre-set operation upon receiving the second power from the power conversion unit;
    a feedback unit having a first feedback unit feeding back a detection signal from the LED driving unit and a second feedback unit feeding back a detection signal detecting the voltage of the second power supplied to the operating unit; and
    a power conversion controller controlling a power conversion switching frequency of the plurality of first powers of the power conversion unit according to the detection signal from the feedback unit and controlling the duty of the second power of the power conversion unit, in synchronization with the power conversion switching frequency.

2. The device of claim 1, wherein the first feedback unit is a first photocoupler transferring a second detection signal detecting a current level flowing across the LED units from the LED driving unit and a voltage level of the first power supplied to the LED driving unit, to the power conversion controller, and the second feedback unit is a second photocoupler transferring a second detection signal detecting a voltage level of the second power supplied to the operating unit, to the power conversion controller.

3. The device of claim 1, wherein the power conversion controller controls a constant current of the first power and controls a constant voltage of the second power.

4. The device of claim 2, wherein the power conversion controller comprises:
    a frequency controller controlling the power conversion switching frequency according to results obtained by comparing a voltage level of the first detection signal and a voltage level of a pre-set first reference voltage;
    a saw-tooth wave generation unit generating a saw-tooth wave according to the power conversion switching frequency from the frequency controller;
    a duty controller controlling a switching duty of the power conversion circuit by comparing an error between a voltage level of the second detection signal and that of a pre-set second reference voltage and the saw-tooth wave from the saw-tooth wave generation unit; and
    a switching controller providing first and second switching signals controlling the alternate switching of the power conversion circuit.

5. The device of claim 4, wherein the frequency controller comprises:
    a first error amplifier comparing the voltage level of the first detection signal and that of the pre-set first reference voltage and amplifying the comparison result according to a pre-set amplification rate;
    a first resistor setting an amplification rate of the first error amplifier according to a pre-set resistance value; and a frequency setting unit setting the power conversion switching frequency according to the comparison result amplified by the first error amplifier.

6. The device of claim 4, wherein the duty controller comprises:
- a second error amplifier comparing the voltage level of the second detection signal and that of the pre-set second reference voltage and amplifying the comparison result according to a pre-set amplification rate;
- a second resistor setting an amplification rate of the second error amplifier according to a pre-set resistance value;
- a comparator comparing the comparison result amplified by the second error amplifier and a voltage level of the saw-tooth wave from the saw-tooth wave generation unit; and
- a duty setting unit setting a switching duty of the power conversion unit according to the comparison result from the comparator.

7. The device of claim 4, wherein the conversion unit comprises:
- a switching unit having first and second switches alternately switched under the control of the power conversion controller;
- a conversion unit converting power switched by the switching unit into power having a voltage level determined according to a pre-set winding ratio, respectively; and
- a rectifying unit rectifying power converted by the conversion unit to output the second power.

8. The device of claim 7, wherein the conversion unit is an LLC resonance type conversion unit having a resonance capacitor and a resonance inductor connected in series to power input terminals of the first and second switches and a magnetized inductor connected in parallel to the first and second switches.

9. The device of claim 7, wherein the conversion unit comprises:
- a primary winding receiving switched power from the switching unit;
- a first secondary winding group having a plurality of first secondary windings converting a voltage level of received power according to a winding ratio formed as the first secondary winding group is electromagnetically coupled to the primary winding, and outputting the first power; and
- a second secondary winding converting a voltage level of received power according to a winding ratio formed as the second secondary winding is electromagnetically coupled to the primary winding, and outputting the second power.

10. The device of claim 7, wherein the conversion unit comprises:
- a first primary winding connected in parallel to the first switch of the switching unit;
- a second primary winding connected in parallel to the second switch of the switching unit;
- a first secondary winding group having a plurality of first secondary windings converting a voltage level of received power according to a winding ratio formed as the first secondary winding group is electromagnetically coupled to the first primary winding, and outputting the first power; and
- a second secondary winding converting a voltage level of received power according to a winding ratio formed as the second secondary winding is electromagnetically coupled to the second primary winding, and outputting the second power.

11. The device of claim 1, wherein the current balancing unit rectifies each of driving powers from the power conversion unit and maintains current balancing among driving powers of the plurality of secondary windings according to the charge balance law.

12. The device of claim 11, wherein the rectifying unit comprises at least one rectifier group having at least two rectifiers, and each of the at least two rectifiers provides power to the plurality of LED units and has one capacitor to maintain current balancing in power supplied to the plurality of corresponding LED units according to the charge balance law.

13. The device of claim 12, wherein the plurality of LED units comprises a first LED lamp, a second LED lamp, a third LED lamp, and a fourth LED lamp,
- the power conversion unit comprises at least one primary winding receiving switched power and a first secondary winding group having a plurality of first secondary windings forming a winding ratio with the at least one primary winding to output the plurality of first powers, respectively, and
- the at least one rectifier group comprises:
  - a first rectifier rectifying driving power from a first first secondary winding of the first secondary winding group and supplying the driving power in a current balance maintained state to the first and second LED lamps; and
  - a second rectifier rectifying driving power from a second first secondary winding of the first secondary winding group and supplying the driving power in a current balance maintained state to the third and fourth LED lamps.

14. The device of claim 13, wherein the first rectifier comprises:
- a first capacitor connected in series to one end of the first first secondary winding and maintaining current balancing between negative driving power and positive driving power from the first first secondary winding according to the charge balance law;
- a first rectifying diode group rectifying driving power from the first capacitor; and
- first and second stabilization capacitors connected in series to a corresponding LED lamp among the first and second LED lamps to stabilize supplied driving power, and
the second rectifier comprises:
- a second capacitor connected in series to one end of the second first secondary winding and maintaining current balancing between negative driving power and positive driving power from the second secondary winding;
- a second rectifying diode group rectifying driving power from the second capacitor; and
- third and fourth stabilization capacitors connected in parallel to a corresponding LED lamp among the third and fourth LED lamps to stabilize provided driving power.

15. The device of claim 14, wherein the first and second rectifying diode groups comprises first to fourth rectifying diodes, respectively,
- the first or second capacitor is electrically connected in series between one end of the first or second first secondary winding and an anode of the first rectifying diode,
- the anode of the first rectifying diode is electrically connected to the first or second capacitor and a cathode of the third rectifying diode,
- a cathode of the first rectifying diode is electrically connected to one end of the second or fourth stabilization capacitor and one end of the second or fourth LED lamp, a cathode of the second rectifying diode and an anode of the fourth rectifying diode are electrically connected to the other end of the first or second first secondary winding, a cathode of the fourth rectifying diode is electrically connected to one end of the first or third stabilization capacitor and one end of the first or third LED lamp, and the other end of the first to fourth stabilization capacitors, the other ends of the first to fourth LED lamps, and anodes of the second and third rectifying diodes are grounded.

16. The device of claim 15, wherein the first and second rectifying diode groups comprise first and second rectifying diodes, respectively, the first or second capacitor is electrically connected in series between one end of the first or second first secondary winding and the anode of the second rectifying diode, the anode of the first rectifying diode is electrically connected to the other end of the first or second secondary winding, the cathode of the first rectifying diode is electrically connected to one end of the first or third stabilization capacitor and one end of each of the first to third LED lamps, the anode of the second rectifying diode is electrically connected together with the first or second capacitor to the other end of the first or third stabilization capacitor and the other end of each of the first to third LED lamps, the cathode of the second rectifying diode is electrically connected to one end of the second or fourth stabilization capacitor and one end of each of the second to fourth LED lamps, and the other end of the second or fourth stabilization capacitor and the other end of each of the second and fourth LED lamps are electrically connected to the other end of first or second first secondary winding.

17. The device of claim 13, wherein the first rectifier comprises:

a first capacitor connected in series to a center tap of the first secondary winding of the first secondary winding group and maintaining current balancing between negative driving power and positive driving power from the first first secondary winding according to the charge balance law;

a first rectifying diode group rectifying driving power from the first capacitor; and first and second stabilization capacitors connected in parallel to a corresponding LED lamp among the first and second LED lamps to stabilize supplied driving power, the second rectifier comprises:

a second capacitor connected in series to a center tap of the second first secondary winding of the first secondary winding group and maintaining current balancing between negative driving power and positive driving power from the second first secondary winding according to the charge balance law;

a second rectifying diode group rectifying driving power from the second capacitor; and third and fourth stabilization capacitors connected in parallel to a corresponding LED lamp among the third and fourth LED lamps to stabilize supplied driving power, the first and second rectifying diode groups comprises first and second rectifying diodes, respectively, the first or second capacitor is electrically connected in series between the center tap of the first or second secondary winding and a ground, the anode of the first rectifying diode is electrically connected to one end of the first or second secondary winding, the cathode of the first rectifying diode is electrically connected to one end of the first or third stabilization capacitor and one end of each of the first and third LED lamps, the anode of the second rectifying diode is electrically connected to the other end of the first or second first secondary winding, the cathode of the second rectifying diode is electrically connected to one end of the second or fourth stabilization capacitor and one end of each of the second and fourth LED lamps, and the other end of each of the first to fourth stabilization capacitors and the other end of each of the first to fourth LED lamps are grounded.

18. The device of claim 13, wherein the number of windings of each of the first secondary windings of the first secondary winding group is the same.

19. The device of claim 13, wherein each of the plurality of LED units comprises at least one LED, at least one LED row in which a plurality of LEDs are connected in series, or a plurality of LED rows connected in parallel to each other.

20. The device of claim 13, wherein the rectifying unit comprises a plurality of rectifying groups.

21. The device of claim 1, wherein the current balancing unit transfers the plurality of first powers from the power conversion unit to each of the LED units such that power of a half period of the plurality of first powers is transferred to the odd numbered LED units among the plurality of LED units and power of the other remaining half period of the plurality of first powers is transferred to the even numbered LED units among the plurality of LED units according to a switching period of the power conversion unit, and maintains current balancing between the power of the half period and the power of the other remaining half period of the plurality of first powers according to the charge balance law.

22. The device of claim 1, wherein the power conversion unit comprises:

a first secondary winding group having at least one primary winding receiving switched power; and a plurality of first secondary windings electromagnetically coupled to the at least one primary winding to output the plurality of powers according to the winding ratio, and the current balancing unit comprises:

a plurality of capacitors electrically connected to the plurality of first secondary windings, respectively, to maintain current balancing according to the charge balance law; and a path providing unit providing an electrical connection path of power transferred from the current balancing unit to the plurality of LED units according to each half period of the plurality of first powers from the power conversion unit.

23. The device of claim 22, wherein the path providing unit comprises:

a first diode group having a plurality of diodes each having a cathode connected to one end of each of the plurality of LED units;

a second diode group having a plurality of diodes which are matched in a one-to-one manner to the plurality of diodes of the first diode group and have a cathode connected to an anode of each of the plurality of diodes of the first diode group; and a third diode group having a plurality of diodes which are matched in a one-to-one manner to the plurality of diodes of the second diode group and have a cathode connected to an anode of each of the plurality of diodes of the second diode group and an anode connected to a ground.

24. The device of claim 23, wherein a first first secondary winding of the plurality of first secondary windings is electrically connected between anodes of the first and second diodes among the plurality of diodes of the first diode group, and a second first secondary winding of the plurality of the first secondary windings is electrically connected between anodes of the second and third diodes among the plurality of diodes of the second diode group.

25. The device of claim 24, wherein a third first secondary winding of the plurality of first secondary windings is electrically connected between anodes of the third and fourth diodes among the plurality of diodes of the first diode group,
   a fourth first secondary winding of the plurality of the first secondary windings is electrically connected between anodes of the fourth and fifth diodes among the plurality of diodes of the second diode group,
   the connection relationship between the plurality of first secondary windings and the plurality of diodes of the first diode group or the plurality of diodes of the second diode group is repeated, and
   the last first secondary winding of the plurality of first secondary windings is electrically connected between anodes of the last diode and the first diode of the plurality of diodes of the second diode group.

26. The device of claim 25, wherein the first capacitor of the plurality of capacitors is electrically connected between one end of the first first secondary winding and the anode of the second diode of the first diode group, and
   the second capacitor of the plurality of capacitors is electrically connected between one end of the second first secondary winding and the anode of the third diode of the second diode group.

27. The device of claim 26, wherein the third capacitor of the plurality of capacitors is electrically connected between one end of the third first secondary winding and the anode of the fourth diode of the first diode group,
   the second capacitor of the plurality of capacitors is electrically connected between one end of the second first secondary winding and the anode of the fifth diode of the second diode group,
   the connection relationship of each of the plurality of capacitors between one end of the secondary winding and the anode of the diode of the first or second diode group is repeated, and
   the last capacitor of the plurality of capacitors is electrically connected between one end of the last secondary winding and the anode of the first diode of the second diode group.

28. The device of claim 22, wherein a start point of the primary winding and those of the plurality of first secondary windings are the same.

29. The device of claim 21, wherein each of the plurality of LED units comprises at least one LED, at least one LED row in which a plurality of LEDs are connected in series, or a plurality of LED rows connected in parallel to each other.

30. The device of claim 1, wherein the LED driving unit further comprises a detection unit detecting current flowing across each of the plurality of LED units.

31. The device of claim 30, wherein the detection unit comprises:
   at least one switch electrically connected in series to at least one LED or at least one LED row of each of the plurality of LED units;
   at least one resistor electrically connected in series to the at least one switch; and
   a comparator comparing a detected current detection value and a pre-set reference value.

32. The device of claim 31, wherein the detection unit transfers a detection value having the lowest value among currents flowing across the plurality of LED units to the feedback unit.

33. The device of claim 1, further comprising:
   a filter unit removing electromagnetic interference included in commercial AC power;
   a rectifying unit rectifying the filtered power from the filter unit; and
   a power factor correction unit correcting a power factor of the rectified power from the rectifying unit and transferring the same as the input power to the power conversion unit.

* * * * *